United States Patent
Dilger et al.

(10) Patent No.: US 8,404,997 B2
(45) Date of Patent: Mar. 26, 2013

(54) MACHINE ARRANGEMENT FOR MACHINING BAR-LIKE WORKPIECES HAVING A DEVICE FOR WORKPIECE SUPPORT

(75) Inventors: Werner Dilger, Leonberg (DE); Ivo Karrasch, Berlin (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 375 days.

(21) Appl. No.: 12/669,471

(22) PCT Filed: Jun. 5, 2008

(86) PCT No.: PCT/EP2008/004473
§ 371 (c)(1),
(2), (4) Date: Jun. 25, 2010

(87) PCT Pub. No.: WO2009/010128
PCT Pub. Date: Jan. 22, 2009

(65) Prior Publication Data
US 2010/0264121 A1  Oct. 21, 2010

(30) Foreign Application Priority Data
Jul. 17, 2007 (EP) .................................. 07013982

(51) Int. Cl.
*B23K 26/38* (2006.01)
(52) U.S. Cl. ................................................ 219/121.67
(58) Field of Classification Search .............. 219/121.67
See application file for complete search history.

(56) References Cited

U.S. PATENT DOCUMENTS

| | | | |
|---|---|---|---|
| 4,566,358 A | 1/1986 | Ducanis | |
| 5,994,667 A * | 11/1999 | Merdan et al. | 219/121.67 |
| 6,335,508 B1 * | 1/2002 | Nam | 219/121.67 |
| 6,930,275 B2 * | 8/2005 | Yamazaki et al. | 219/121.67 |

(Continued)

FOREIGN PATENT DOCUMENTS

| | | |
|---|---|---|
| DE | 3448040 | 5/1986 |
| DE | 19721330 A1 | 11/1997 |

(Continued)

OTHER PUBLICATIONS

English translation of the International Preliminary Report on Patentability for international application No. PCT/EP2008/004473 issued by the International Searching Authority (mailed on Feb. 18, 2010).

(Continued)

*Primary Examiner* — William D Coleman
(74) *Attorney, Agent, or Firm* — Michael D. Bednarek; Axinn Veltrop & Harkrider LLP (57) ABSTRACT

A mechanical arrangement (1) for processing rod-like workpieces, especially pipes (2), has a processing device (20) for processing a workpiece, a workpiece-moving device (6) for moving workpieces (2) relative to the processing device (20), and a device (11) for supporting a workpiece in the direction of gravity. The device (11) for supporting a workpiece includes at least one support roller (13) which forms at its outer periphery a workpiece rest. The workpiece rest at the outer periphery of the support roller (13) extends about a roller rotation axis (14) of the support roller (13) at a changing center distance. The support roller (13) is rotatable about the roller rotation axis (14) in a controlled manner and is thereby positionable in different rotational positions.

13 Claims, 4 Drawing Sheets

U.S. PATENT DOCUMENTS

| | | | |
|---|---|---|---|
| 7,337,644 B2* | 3/2008 | Pang | 72/342.1 |
| 2004/0164062 A1 | 8/2004 | Horisberger | |
| 2008/0135531 A1* | 6/2008 | Widmann et al. | 219/121.72 |

FOREIGN PATENT DOCUMENTS

| | | |
|---|---|---|
| DE | 10249106 | 4/2004 |
| EP | 1002622 B1 | 5/2005 |
| GB | 2080160 | 2/1982 |
| GB | 2196557 | 5/1988 |
| IT | MI2005A001693 | 9/2005 |
| JP | 59069203 | 4/1984 |

OTHER PUBLICATIONS

International Search Report and Written Opinion for international application No. PCT/EP2008/004473 issued by the International Searching Authority mailed on Jul. 23, 2008.

English translation of Korean Office Action dated Aug. 31, 2012.

* cited by examiner

MACHINE ARRANGEMENT FOR MACHINING BAR-LIKE WORKPIECES HAVING A DEVICE FOR WORKPIECE SUPPORT

CROSS-REFERENCE TO RELATED APPLICATIONS

This application is a U.S. National Stage of International Application No. PCT/EP2008/004473 filed Jun. 5, 2008, which claims priority to EP 07013982.9 filed Jul. 17, 2007.

FIELD OF THE INVENTION

The invention relates to a mechanical arrangement for processing rod-like workpieces, especially pipes.

BACKGROUND

An arrangement of that kind is known from DE 34 48 040 A1. The prior art relates to an automatic sawing machine having a sawing station to which workpieces that are to be processed, preferably hollow profile sections, are fed by means of a charging device. The charging device includes a roller conveyor and a feed carriage with vice. By means of a transverse transporting device, a workpiece to be processed is placed on the roller conveyor. The individual rollers of the roller conveyor, which are arranged one behind another in the longitudinal direction of the workpiece, support the workpiece from below counter to the effect of gravity and position the workpiece in the vertical direction in such a manner that the rear end of the workpiece, remote from the sawing station, can be grasped by the vice of the feed carriage. When the rear end of the workpiece has been tightened in the vice, the feed carriage travels together with the workpiece in the longitudinal direction thereof and thereby positions the workpiece relative to the sawing station. During the feed movement of the workpiece, the individual rollers of the roller conveyor roll over the underside of the workpiece. The individual rollers rotate in this instance about central rotation axes of the rollers. The workpiece rest formed by the individual rollers of the prior-known roller conveyor is immovable in the vertical direction. Consequently, the position adopted in the vertical direction by a reference plane or reference axis situated in the interior of the workpiece, for example a longitudinal central plane or a longitudinal central axis of the workpiece resting on the roller conveyor, is dependent on the cross-sectional dimensions of the workpiece.

The object of the present invention is to avoid such a dependence.

SUMMARY OF INVENTION

In accordance with the invention, that object is attained by the mechanical arrangement according to the patent claims.

In one embodiment, the mechanical arrangement is an apparatus for processing a workpiece, such as a tubular member, the apparatus comprising a laser cutting head and a machine bed associated with the laser cutting head. The machine bed comprises a mount for receiving and holding the workpiece, a support roller positioned between the laser cutting head and the mount and a rest positioned on the support roller. The support roller is rotatable about a support roller rotation axis that extends transverse to the workpiece. The rest comprises a portion for supporting the workpiece in a radial direction of the support roller rotation axis, where rotation of the support roller about the support roller rotation axis changes both the positioning of the rest about the support roller rotation axis and the distance between the portion of the rest supporting the workpiece and the support roller rotation axis in the radial direction of the support roller rotation axis.

In another embodiment, the mechanical arrangement is an apparatus for processing a workpiece, such as a tubular member, comprising a laser cutting head and a machine bed associated with the laser cutting head. The machine bed comprises a mount for receiving and holding the workpiece, a support roller positioned between the laser cutting head and the mount and a rest positioned on the support roller. The support roller is rotatable about a support roller rotation axis that extends transverse to the workpiece. The rest comprises opposing curvilinear sidewalls and arcuate surface for supporting the workpiece. Each opposing sidewall extends circumferentially around the axis and is spaced apart from the opposing sidewall by a variable distance over a circumferential length of the rest. The arcuate surface forms a spiral about the support roller rotation axis and defines a center line equidistant from the two curvilinear sidewalls. The center line is spaced a variable distance from the support roller rotation axis in the radial direction along the circumferential length of the rest.

The foregoing embodiments may include several additional features. The support roller may comprise a plurality of rest portions wherein two or more of said rest portions extend at different distances between the rest portions and the support roller rotation axis. The support roller may also comprise a circumferential groove comprising a wall that forms the rest. This circumferential groove may comprise a groove cross-section that decreases as the radial distance from the support roller rotation axis to the circumferential groove increases. The circumferential groove may also comprise a plurality of groove portions that follow each other and extend about the support roller rotation axis with a constant groove cross-section over a limited circumferential angle. This groove cross section may be the cross-section of a segment of a circle. In addition, the rest may extend spirally about the support roller rotation axis. Advantageously, rotation of the support roller about the support roller rotation axis can change the positioning of the rest about the support roller rotation axis such that the longitudinal axes of workpieces of different cross-sectional dimensions are positioned in the same location relative to the laser cutting head and/or to the mount for receiving and holding a workpiece when said workpieces are supported by said rest.

Other optional aspects of the invention include repositioning the support rollers and the use of motors for various purposes. Adjustment of the support roller about the support roller rotation axis may be accompanied by lowering or raising in the vertical direction of the portion of the rest supporting the workpiece. Also, a controllable motor drive may rotate the support roller about the support roller rotation axis and thereby position the portion of the rest supporting the workpiece in different positions about the support roller rotation axis. Finally, the apparatus may comprise two or more support rollers, where a common controllable drive motor rotates the support rollers about their respective support roller rotation axes.

BRIEF DESCRIPTION OF THE DRAWINGS

The invention is described in detail hereinafter with reference to schematic drawings of an illustrative embodiment, in which.

DETAILED DESCRIPTION

Figure 1:
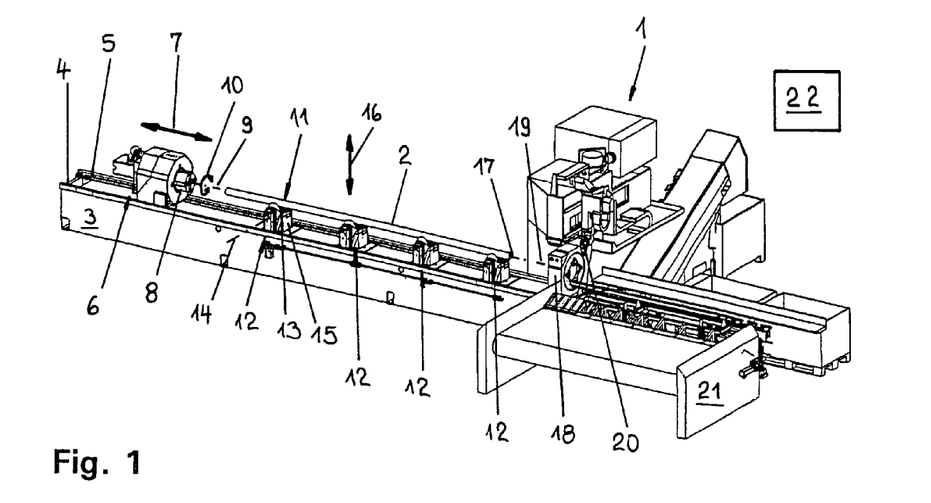
FIG. 1 shows a mechanical arrangement for processing pipes by cutting, shown before commencement of pipe processing.

As shown in FIG. 1, a mechanical arrangement 1 for processing pipes 2 by cutting has a machine bed 3 with guide rails 4, 5 for a rotating/feeding station 6 serving as a workpiece-moving device. The rotating/feeding station 6 is motor-driven to be displaceable on the guide rails 4, 5 in the direction of a double-headed arrow 7. On the side towards the pipe 2, the rotating/feeding station 6 has a self-centring clamping chuck 8. A clamping axis 9 of the clamping chuck 8 extending through the clamping centre of the clamping chuck 8 is indicated by a dot-dash line. The clamping chuck 8 is rotatable in a controlled manner about the clamping axis 9 in the direction of a double-headed arrow 10. FIG. 1 shows the clamping chuck 8 in the open state.

The pipe 2 to be processed is supported from below counter to the effect of gravity by a device 11 for supporting a workpiece, which device 11 is integrated in the machine bed 3. In the example illustrated, the device 11 for supporting a workpiece includes a total of four modules in the form of bottom pipe supports 12. Each of the bottom pipe supports 12 has a support roller 13 having a roller rotation axis 14 that extends transversely to the pipe 2 and, in so doing, extends in the horizontal direction. At the outer periphery of the support rollers 13, the pipe 2 is supported in the direction of gravity. Each of the support rollers 13 is attached to a supporting structure 15 and can be raised and lowered together therewith in the direction of a double-headed arrow 16, i.e. in the vertical direction. With the supporting structure 15 lowered, the relevant support roller 13 is below the level of the guide rails 4, 5 for the rotating/feeding station 6 which are mounted on the machine bed 3. If, as shown in FIG. 1, the supporting structures 15 are raised, the support rollers 13 support the pipe 2 in the vertical direction in such a manner that a pipe axis 17 coincides with the clamping axis 9 of the clamping chuck 8 at the rotating/feeding station 6. The pipe 2 has been placed on the support rollers 13 of the bottom pipe supports 12 by means of a charging device, not shown. The pipe 2 has been fed to the charging device from a pipe magazine, also not shown.

At the end of the pipe 2 remote from the rotating/feeding station 6, FIG. 1 shows a push-through chuck 18 which is immovably mounted on the machine bed 3. In the illustrated operative state of the mechanical arrangement 1, a guide axis 19 of the push-through chuck 18 coincides with the pipe axis 17 and with the clamping axis 9 of the clamping chuck 8 at the rotating/feeding station 6.

At the side of the push-through chuck 18 opposite the pipe 2, a laser cutting head 20 is provided in FIG. 1 as the processing device, by means of which cut-outs may be made in the wall of the pipe 2 and pipe sections may be cut to length. Pipe sections severed from the remainder of the pipe arrive under gravity on an unloading table 21 from which they may be removed manually or with the use of mechanical aids.

The main sequences of operations on the mechanical arrangement 1 are controlled by a numerical control 22.

For processing of a workpiece, the rotating/feeding station 6 travels, with the clamping chuck 8 open, from its position shown in FIG. 1 in the direction towards the pipe 2, which is in its vertical desired position, until the rear end of the pipe arrives inside the clamping chuck 8. The clamping chuck 8 is then closed and the pipe 2 is thereby clamped to the rotating/feeding station 6. A prerequisite for functionally satisfactory clamping of the pipe 2 is the congruence of the pipe axis 17 on the one hand and of the clamping axis 9 of the clamping chuck 8 on the other hand.

The rotating/feeding station 6 moves together with the clamped pipe 2 in the direction towards the laser cutting head 20. In that movement, first the forward end of the pipe 2 enters the push-through chuck 18, the guide aperture of which is set to a width corresponding to the outside diameter of the pipe 2. As a result, play-free supporting of the pipe 2 in the radial direction is obtained at the push-through chuck 18. The pipe 2 may be moved through the push-through chuck 18 in the axial direction by means of the rotating/feeding station 6. In addition, the pipe 2 is rotatable about the pipe axis 17 in the interior of the push-through chuck 18. The decisive factor for the functioning of the push-through chuck 18 is the correspondence between the position of the pipe axis 17 of the workpiece to be guided and the position of the guide axis 19 of the push-through chuck 18.

By means of the described translational movement of the rotating/feeding station 8 the pipe 2 is advanced to the desired processing position in the axial direction relative to the laser cutting head 20. If pipe sections are to be cut to length by the laser cutting head 20 with a cutting plane extending in the transverse direction of the pipe and perpendicular to the pipe axis 17, with the rotating/feeding station 6 stationary in the axial direction the axial advancing movement of the pipe 2 is followed by a rotational movement of the clamping chuck 8 and hence by a rotational movement of the pipe 2 in one of the directions of the double-headed arrow 10. If pipe sections are to be cut to length with a cutting plane oriented obliquely with respect to the pipe axis 17 or if cut-outs are to be made in the wall of the pipe 2, an axial movement of the pipe brought about by translation of the rotating/feeding station 6 in the direction of the double-headed arrow 7 is superimposed on a rotational movement of the pipe 2 produced by rotation of the clamping chuck 8. Before processing of the pipe is commenced, the laser cutting head 20 is positioned in the proper position in the radial direction of the pipe 2. During cutting of pipes with a circular cross-section, the laser cutting head 20 remains stationary in the radial direction of the pipes. When rectangular pipes are being processed, the laser cutting head may execute a movement in the radial direction of the pipes.

Figure 2:
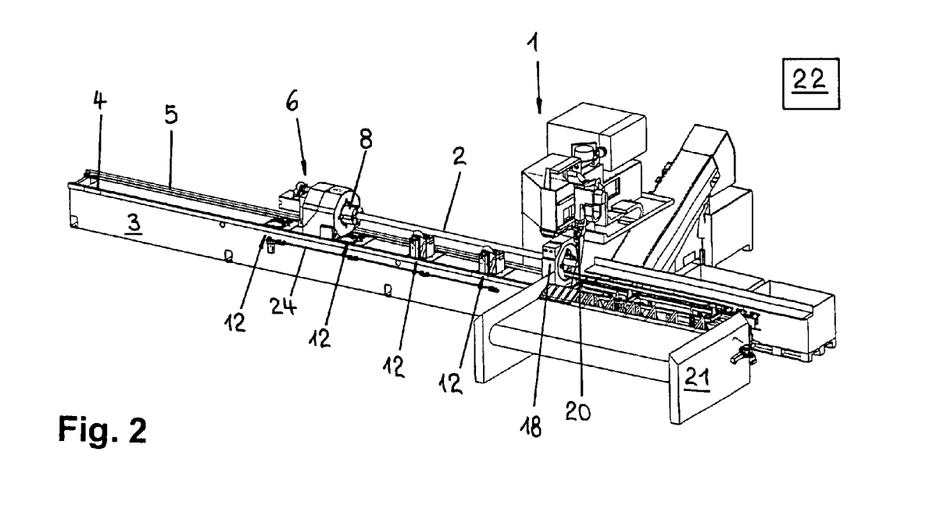
FIG. 2 shows the mechanical arrangement of FIG. 1 during pipe processing.

As the pipe is being fed in the direction towards the laser cutting head 20, the rotating/feeding station 6 approaches first of all the bottom pipe support 12 closest to it in FIG. 1. Immediately before the rotating/feeding station 6 reaches that bottom pipe support 12, its supporting structure 15 together with the support roller 13 supported thereon is moved downwards and is thereby sunk into the machine bed 3. The rotating/feeding station 6 is able to travel over the lowered bottom pipe support 12 in the direction towards the laser cutting head 20. In FIG. 2, the rotating/feeding station 6 is shown after travelling over the first and before travelling over the second bottom pipe support 12. The rotating/feeding station 6 is able to travel past the further bottom pipe supports 12 in a corresponding manner.

Figure 3:
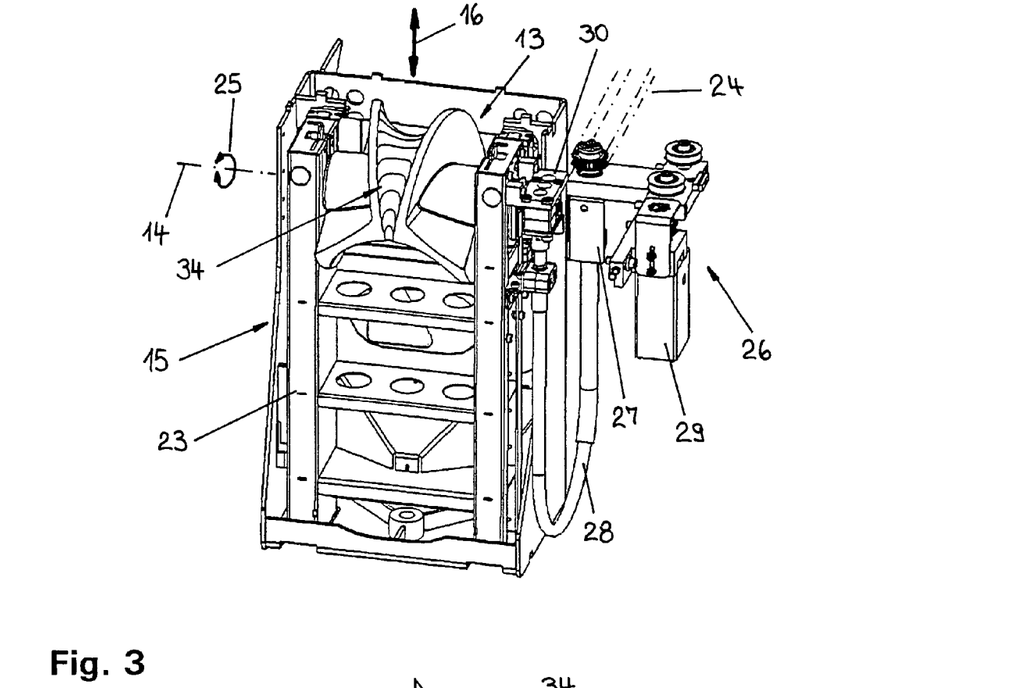
FIG. 3 shows a module of the mechanical arrangement shown in FIGS. 1 and 2, provided with a support roller for supporting a pipe.

In terms of construction, all of the bottom pipe supports 12 are configured as shown in FIG. 3. The supporting structure 15 includes a supporting frame 23 which may be raised and lowered in the direction of the double-headed arrow 16 by means of a pneumatic piston/cylinder unit, not shown. The support roller 13 is arranged between the upper ends of two vertical frame members of the supporting frame 23. Journals of the support roller 13 define the roller rotation axis 14. The support roller 13 may be positioned about the roller rotation axis 14 in the direction of a double-headed arrow 25. The positioning of the support roller 13 is effected by means of a controllable motor drive 26. As shown in FIG. 3, the motor drive 26 includes a coupling 27 and a flexible shaft 28. The flexible shaft 28 is connected via the coupling 27 to a drive motor 29. The drive motor 29 serves for synchronous rotational adjustment of all the support rollers 13 of the device 11 for supporting a workpiece. For that purpose, a toothed belt 24, suggested in FIG. 3, is provided, which connects the further bottom pipe supports 12 to the drive motor 29.

At its driving end, the flexible shaft 28 is coupled to an adjusting gear mechanism housed in a housing 30. Owing to its flexibility, the flexible shaft 28 is able to follow movements of the support roller 13 in the direction of the double-headed arrow 16 without any difficulty.

In the example illustrated, the adjusting gear mechanism for the support roller 13 is in the form of a worm gear mechanism. A gearwheel on the drive side is driven about a wheel axis by the rotating flexible shaft 28. The gearwheel on the drive side drives in turn a worm gear on the support roller side, which worm gear is for its part fixedly connected to the support roller 13. Rotational movements of the gearwheel on the drive side about the axis of the wheel are converted by way of the worm gear on the support roller side into adjusting movements of the support roller 13 about the roller rotation axis 14. Any other toothed gear mechanism or a friction gear mechanism is perfectly conceivable instead of the worm gear mechanism provided in this instance.

In every case, the motor drive 26 of the support rollers 13 is self-locking. Once a rotational adjustment of the support rollers 13 has been made, therefore, it is retained, without special means for securing the support rollers 13 against rotation being required for that purpose.

Figure 4:
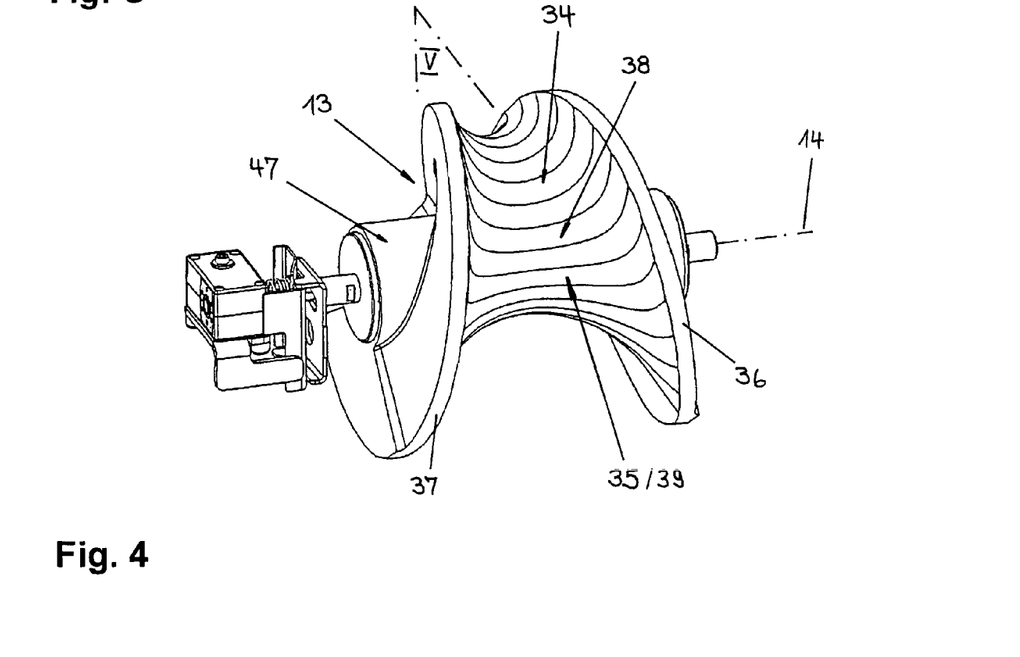
FIG. 4 shows the support roller of the module shown in FIG. 3, and FIGS. 5 and 6 are views illustrating the mode of operation of the support roller shown in FIG. 4.

As will be apparent from FIGS. 3 and 4, the support roller 13 has a circumferential groove 34 extending about the roller rotation axis 14. The wall of the circumferential groove 34 forms a workpiece rest 35 on which the pipes 2 supported from below in the direction of gravity by means of the device 11 for supporting a workpiece are supported. The supported pipes 2 are supported laterally by groove side walls 36, 37 of the support roller 13.

Figure 5:
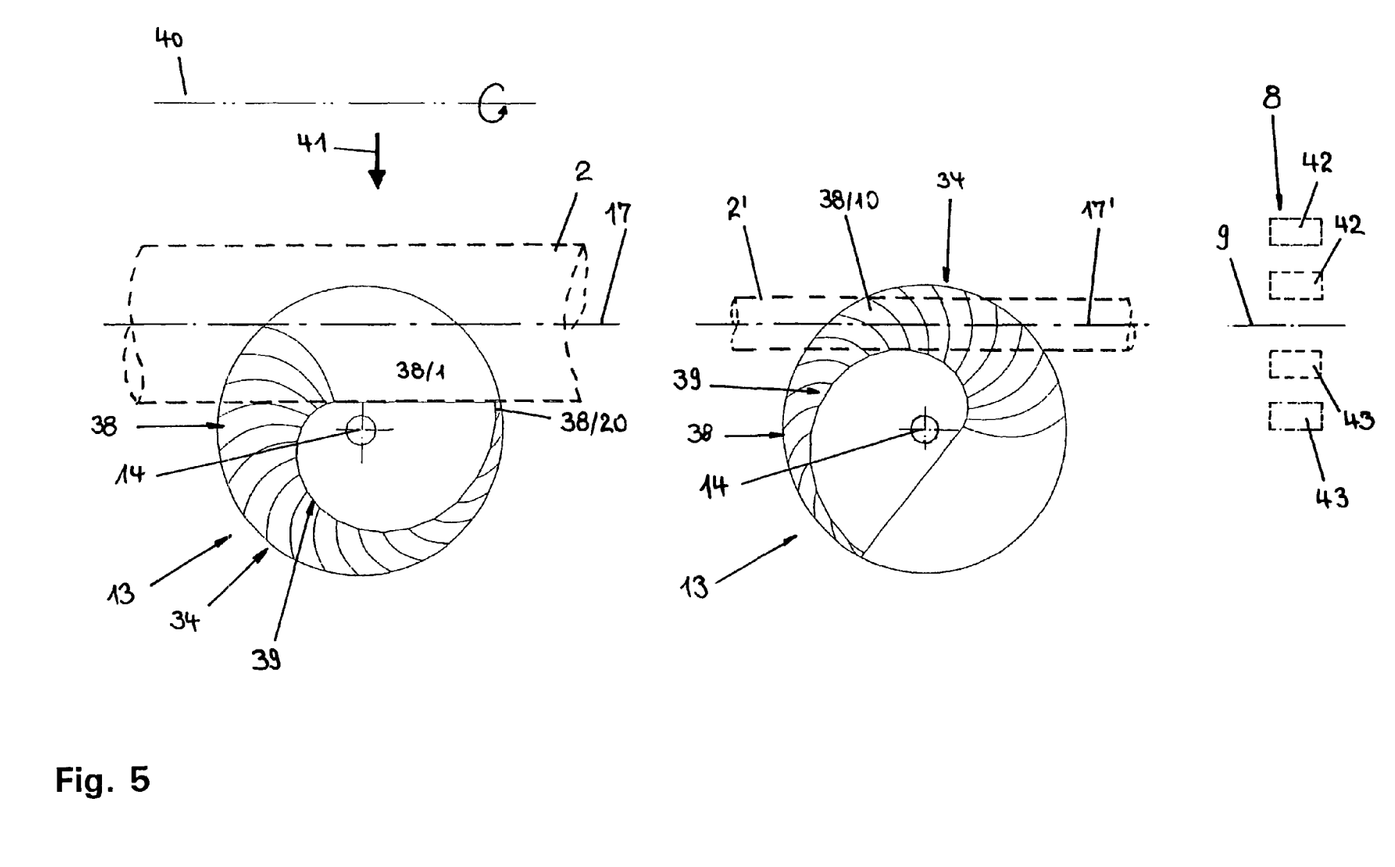

The support roller of FIGS. 3 and 4 is illustrated in detail in FIG. 5. FIG. 5 shows sectional views of the support roller 13 with a plane of section V, indicated in FIG. 4, extending perpendicular to the roller rotation axis 14, through the centre of the support roller 13.

As shown in FIG. 5, the circumferential groove 34 comprises a plurality of groove portions 38—a total of twenty in the example illustrated—which follow one another about the roller rotation axis 14. All of the groove portions 38 have a cross-section in the shape of a segment of a circle. The cross-sectional size of the groove portions 38 decreases in the circumferential direction of the support roller 13 from a maximum cross-section of a groove portion 38/1 to a minimum cross-section of a groove portion 38/20. The change in the cross-sectional size of the circumferential groove 34 takes place discontinuously.

A similarly discontinuous transition occurs on the workpiece rest 35 as it passes from one of the groove portions 38 to the respective adjacent groove portion. The workpiece rest 35 extends along the groove base visible in FIG. 5, that is, along the apex line of the circumferential groove 34. If—as is provided in the example shown in FIG. 5—pipes 2 of circular-cylindrical cross-section are being supported, the supporting of the workpiece on the support roller 13 in the example illustrated will in any case take place on the groove base of the circumferential groove 34.

Owing to the division of the circumferential groove 34 into the groove portions 38, the workpiece rest 35 is composed of rest portions 39 which follow one another about the roller rotation axis 14.

The rest portions 39 formed by the individual groove portions 38 are all linear. Adjacent rest portions 39 lead into one another with discontinuities being formed. The radial distance of the rest portions 39 and hence of the workpiece rest 35 from the roller rotation axis 14 increases in the circumferential direction of the support roller 13 from a minimum value at the groove portion 38/1 to a maximum value at the groove portion 38/20. The workpiece rest 35 extends to a good approximation in the form of a spiral about the roller rotation axis 14. By virtue of the geometry of the workpiece rest 35 it is ensured that the axes of pipes that have different cross-sectional dimensions and which consequently are assigned to different groove portions 38 of the support roller 13 are at the same distance from the roller rotation axis 14 when supported on the support roller 13 and at the same time coincide with the clamping axis 9 of the clamping chuck 8 and with the guide axis 19 of the push-through chuck 18.

The described shape of the circumferential groove 34 on the support roller 13 is determined by the method employed in making the circumferential groove 34.

For example, the circumferential groove 34 has been milled from the solid material of a circular-cylindrical blank for the support roller 13. A rotation axis 40 of the milling tools used to make the circumferential groove 34 is indicated in FIG. 5. The milling tools had a cylindrical shape. The axes of the cylindrical milling tools coincided with the rotation axis 40. A feed direction 41, in which the milling tools were moved relative to the blank for the support roller 13, is illustrated by an arrow in FIG. 5. A separate milling tool was used for each groove portion 38 of the circumferential groove 34. The radius of the respective milling tool corresponded to the radius of the relevant groove portion 38 of the circumferential groove 34. Alternatively, a single milling tool having, for example, the radius of the groove portion 38/20 could have been used. To produce the groove portion 38/20, that milling tool would merely have had to have been moved in the feed direction 41, in a plane of movement parallel to the roller rotation axis 14. The making of the other groove portions 38 would have required multiple-axis movement of the milling tool in the mentioned plane of movement and relative to the blank for the support roller 13. With a view to minimising weight, when making the support rollers 13 all of the regions of the support roller blank that are not necessary for their functioning have been removed. That has left the side walls 36, 37 of the circumferential groove 34 and a circular-cylindrical bearing portion 47 (FIG. 4) by means of which the support roller 13 is supported on the supporting structure 15 of the bottom pipe support 12.

The mode of operation of the support rollers 13 of the device 11 for supporting a workpiece may also be seen in detail from FIG. 5.

FIG. 5 shows one and the same support roller 13 with two different rotational settings. In the rotational setting of the left-hand part of FIG. 5, the groove portion 38/1, i.e. the one of the groove portions 38 that has the largest groove cross-section, is being used to support the pipe 2 in the direction of gravity. The pipe 2 has the maximum diameter that can be processed with the mechanical arrangement 1. Clamping jaws 42, 43 of the clamping chuck 8 at the rotating/feeding station 6, which clamp in the vertical direction, act on the pipe 2 at its outside wall. Owing to the selected rotational setting of the support roller 13, the pipe axis 17 of the pipe 2 is arranged in the vertical direction in such a manner that it coincides with the clamping axis 9 of the clamping chuck 8.

If, instead of the pipe 2, a pipe 2' is to be processed, the support roller 13 has to be moved out of the rotational position shown in the left-hand part of FIG. 5 and into the rotational position shown in the right-hand part of FIG. 5. For that purpose, the motor drive 26 is actuated. Under numerical control, the support roller 13 in the left-hand part of FIG. 5 is moved in the circumferential direction until a groove portion 38/10 of the circumferential groove 34 is oriented with its groove base horizontal. The groove portion 38/10 has a radius that is approximately identical to the radius of the pipe 2'. Just as the pipe 2 before in the groove portion 38/1, now the pipe 2' is supported in the groove portion 38/10 of the circumferential groove 34 both in the direction of gravity and laterally. A pipe axis 17' of the pipe 2' coincides with the clamping axis 9 of the clamping chuck 8 of the rotating/feeding station 6.

Following clamping by means of the clamping chuck 8, by translating the rotating/feeding station 6 and/or by rotating the clamping chuck 8 both the pipe 2 and the pipe 2' are moved relative to the laser cutting head 20 in the manner required for the processing operation that is to be carried out. During that movement of the pipe 2 or the pipe 2', the support roller 13 maintains its rotational setting unchanged. During axial and during rotational movements, the pipes 2, 2' slide over the wall of the respective groove portion 38/1, 38/10 of the circumferential groove 34 on the support roller 13.

The groove portions 38 are distributed over the outer periphery of the support roller 13 in such a manner that those groove portions 38 that are adjacent to and have a smaller groove cross-section than the groove portion used to support the pipe 2, 2' do not lie with their groove side walls, as viewed in the circumferential direction of the support roller 13, inside the groove side walls of the groove portion used to support the pipes.

If, in the situation shown in the right-hand part of FIG. 5, the pipe 2' is moved to the left, that is, towards the laser cutting head 20, and if in that case the support roller 13 is unintentionally turned slightly counter-clockwise by the axially moving pipe 2', then both the guiding of the pipe 2' on the support roller 13 and the axial mobility of the pipe 2' relative to the support roller 13 are maintained. Owing to the length of the groove portion 38/10 in the circumferential direction of the support roller 13, guiding of the pipe 2' by the groove portion 38/10 is ensured even when the support roller 13 slightly leaves its rotational setting shown in FIG. 5 in a counter-clockwise direction. Since the cross-section of the circumferential groove 34 increases counter to the feed direction of the pipe 2', a slight rotation of the support roller 13 in the counter-clockwise direction has the effect that groove portions 38 whose radius is greater than the radius of the pipe 2' and which therefore do not jam the pipe 2' are turned towards the pipe 2'. The vertical displacement of the pipe 2' associated with the slight rotational movement of the support roller 13 is negligible.

Figure 6:
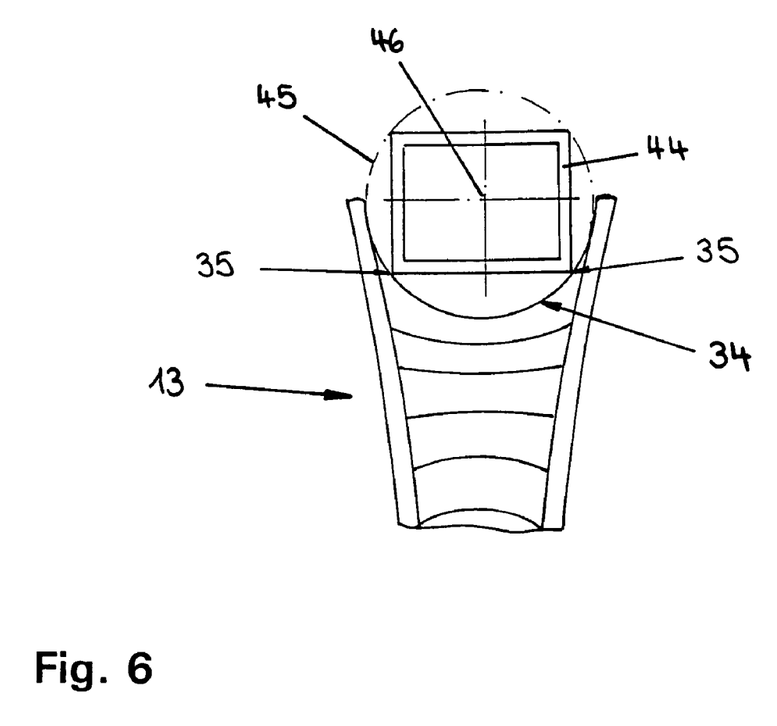

As shown in FIG. 6, the use of the support roller 13 is not limited to pipes 2, 2' of circular cross-section. Rather, any desired rotationally symmetrical profile sections, including rectangular profile sections 44, for example, may be supported from below by means of the support roller 13. To support the rectangular profile section 44, that one of the groove portions 38 whose radius corresponds to the radius of a circumscribed circle 45 of the rectangular profile section 44 is used. In the example shown in FIG. 6, the workpiece rest 35 extends linearly on mutually opposite sides of the groove portion used to support the rectangular profile section 44. To enable the rectangular profile section 44 to be clamped by its rear end at the clamping chuck 8 in a centred manner, a profile section axis 46 must be placed in the clamping axis 9 of the clamping chuck 8 by appropriate rotational adjustment of the support roller 13. Furthermore, the profile section axis 46 must coincide with the guide axis 19 of the push-through chuck 18.

While certain embodiments of the present invention have been shown and described, it will be obvious to those skilled in the art that changes and modifications may be made without departing from the spirit and scope of the invention. The matter set forth in the foregoing description and accompanying drawings is offered by way of illustration only and not as a limitation. The actual scope of the invention is intended to be defined in the following claims.

The invention claimed is:

1. An apparatus for processing a workpiece, said apparatus comprising:
   a laser cutting head;
   a machine bed associated with said laser cutting head, said machine bed comprising
   a) a mount for receiving and holding the workpiece;
   b) a support roller positioned between said laser cutting head and said mount, said support roller rotatable about a support roller rotation axis that extends transverse to the workpiece; and
   c) a rest that is positioned on the support roller and extends spirally about the support roller rotation axis, said rest comprising a portion for supporting the workpiece in a radial direction of the support roller rotation axis, wherein rotation of the support roller about the support roller rotation axis changes both the positioning of the rest about the support roller rotation axis and the distance between said portion of the rest supporting the workpiece and the support roller rotation axis in the radial direction of the support roller rotation axis.

2. The apparatus of claim 1, wherein the support roller comprises a plurality of rest portions wherein two or more of said rest portions extend at different distances between the rest portions and the support roller rotation axis.

3. The apparatus of claim 1, wherein the support roller comprises a circumferential groove comprising, a wall that forms the rest.

4. The apparatus of claim 1, wherein adjustment of the support roller about the support roller rotation axis is accompanied by lowering or raising in the vertical direction of the portion of the rest supporting the workpiece.

5. The apparatus of claim 1, wherein a controllable motor drive rotates the support roller about the support roller rotation axis and thereby positions the portion of the rest supporting the workpiece in different positions about the support roller rotation axis.

6. The apparatus of claim 1, further comprising at least one additional support roller positioned between said laser cutting head and said mount, wherein a common controllable drive motor rotates at least two of the support rollers about their respective support roller rotation axes.

7. The apparatus of claim 1, wherein said workpiece is a tubular member.

8. The apparatus of claim 3, wherein the circumferential groove comprises a groove cross-section that decreases as the radial distance from the support roller rotation axis to the circumferential groove increases.

9. The apparatus of claim 3, wherein the circumferential groove comprises a plurality of groove portions that follow each other and extend about the support roller rotation axis with a constant groove cross-section over a limited circumferential angle.

10. The apparatus of claim 3, wherein the circumferential groove comprises a cross-section that is the cross-section of a segment of a circle.

11. An apparatus for processing a workpiece, said apparatus comprising:
   a laser cutting head;
   a machine bed associated with said laser cutting head, said machine bed comprising
   a) a mount for receiving and holding the workpiece;
   b) a support roller positioned between said laser cutting head and said mount, said support roller rotatable about a support roller rotation axis that extends transverse to the workpiece; and
   c) a rest positioned on the support roller, said rest comprising:
      (i) opposing curvilinear sidewalls, each sidewall extending circumferentially-around the axis and spaced apart from the opposing sidewall by a variable distance over a circumferential length of the rest; and
      (ii) an arcuate surface for supporting the workpiece, said arcuate surface forming a spiral about the support roller rotation axis and defining a center line equidistant from the two curvilinear sidewalls, wherein said center line is spaced a variable distance from the support roller rotation axis in the radial direction along the circumferential length of the rest.

12. The apparatus of claim 11, wherein rotation of the support roller about the support roller rotation axis changes the positioning of the rest about the support roller rotation axis such that the longitudinal axes of workpieces of different cross-sectional dimensions are positioned in the same location relative to the laser cutting head and/or to the mount for receiving and holding a workpiece when said workpieces are supported by said rest.

13. The apparatus of claim 11, wherein the support roller comprises a plurality of rest portions wherein two or more of said rest portions extend at different distances between the rest portions and the support roller rotation axis.

* * * * *